Sept. 24, 1946.   G. WOOD   2,408,183
AUTOMATIC DRAIN DEVICE FOR COOLING SYSTEM
Filed Oct. 25, 1944   2 Sheets-Sheet 1

George Wood
INVENTOR

Patented Sept. 24, 1946

2,408,183

UNITED STATES PATENT OFFICE 2,408,183

AUTOMATIC DRAIN DEVICE FOR COOLING SYSTEMS

George Wood, Toronto, Ontario, Canada

Application October 25, 1944, Serial No. 560,324

5 Claims. (Cl. 123—174)

The invention relates to improvements in engine warming devices as described in the present specification and shown in the accompanying drawings that form a part of the same.

The objects of the invention are to provide simple and efficient means whereby the water, and oil, used in the cooling and lubricating systems of an internal combustion engine may be easily and quickly transferred from the cooling system, after the engine has been stopped, to an insulated auxiliary tank for any inoperative period of the engine and thereby kept in a heated condition pending further operation of the motor, at which time it may be quickly returned to the engine in a heated state whereby to instantaneously heat the engine block and insure easy starting; to eliminate the necessity of using antifreeze and thereby avoiding the corrosion of metal and damage to parts usually occasioned by its use; to provide efficient means for forcing the liquid to and from the auxiliary tank regardless of the position of such tank in relation to the engine and radiator, to provide a device of the type specified which will operate automatically upon the turning of the ignition switch, thereby eliminating all danger of damage to the engine parts such as might be occasioned were the engine kept in operation after the liquid had been removed from the cooling system; and generally to provide a device for the purpose specified which will be simple and inexpensive to construct, easy to install, efficient in operation and in connection with which there will be no operating cost.

With the above and other objects in view the invention consists in the novel features of construction, arrangements and combinations of parts described in the present specification and more particularly pointed out in the claims for novelty following.

In describing the invention reference will be made to the accompanying drawings, in which:

Figure 5 is a vertical sectional view through the electric switch.

Like numerals of reference indicate corresponding parts in the various figures.

Figure 1:
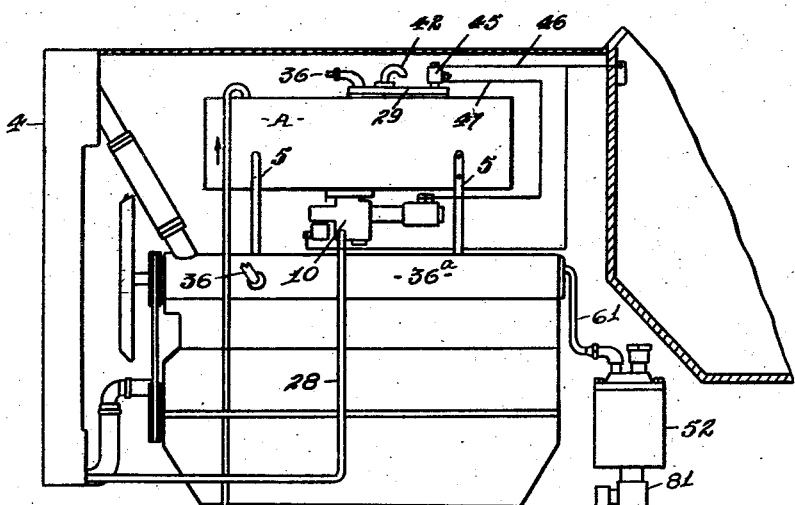
Figure 1 is a side elevation of an automobile engine and cooling system showing the invention incorporated therewith.

Referring to the drawings. In the present preferred embodiment of the invention I employ and auxiliary tank A, comprising spaced walls 1 and 2 between which any desirable insulating material, indicated by the numeral 3, may be inserted, whereby to insure the liquid in the tank remaining at, or near, for a long period of time regardless of the condition of the outside atmosphere, the temperature obtaining at the time of insertion into the tank.

The tank may be of any desired shape to conveniently fit beneath the hood of an automobile engine, and is shown herein positioned above the engine block near the level of the top of the radiator 4, but as will be apparent from the ensuing description it may be placed in any desired location, and said tank may be supported in any desired manner, such as by the employment of brackets 5.

In order to accommodate both the oil and the water, or other cooling liquid, the tank A is preferably divided by a vertical partition 6 into two separate compartments 7 and 8 respectively, one compartment, herein shown as 7, preferably being the larger of the two to hold the water used in the cooling system and the other and smaller compartment 8 being for the reception of the oil from the crank case.

The tank is provided with an opening 9 in the bottom thereof to permit of the passage of the water from the cooling system to the interior of the water compartment 7 of the auxiliary tank.

A valve casing 10 is secured in any desired manner to the under side of the tank A with the outlet opening 11 thereof in register with the inlet 9 in said tank whereby the water may flow into and out of the water compartment 7.

The valve casing 10 is provided with a vertical water passage 10a extending completely through same and has an inlet opening 12 in the bottom and said casing is also provided with a centrally disposed vertical deflecting member 13 positioned between the inlet and outlet openings and spaced at its ends from the top and bottom walls of the casing whereby to provide two distinct passages for the water, the one passage 11a being employed in the transfer of the water to the auxiliary tank and the other, 10a, to be used in the transfer of the water from the said auxiliary tank, the route being pre-determined by the position of the valve, as will be described in detail hereinafter.

The valve casing 10 is provided with opposed centrally disposed horizontal extensions 14 and 15 respectively, both of which are bored to receive a horizontally operable valve 16 which extends through the deflecting wall 13 and both being closed at their ends.

The extension 14 of the valve casing 10 may be of even bore throughout its length while the extension 15 is enlarged interiorly for a portion of its length near its outer end for the reception of a solenoid coil 18, the purpose of which latter will be set out in detail hereinafter.

The valve 16 which is slidably supported in the bores of the extension 14 and the deflecting wall 13 and in the bore of the portion 19 of the extension 15 has a circumferential cut 20 therein near the end of the portion which is supported within the extension 14, adapted in the one position of the valve to register with the passage 10a whereby to provide a passage for the water from the auxiliary tank A and said valve also has another circumferential cut 21 adapted in another position of the valve to register with the passage 11a whereby to provide a passage around the wall 13 for the water from the inlet 12 in progress to the said auxiliary tank.

The valve 16 is preferably of such length that when it is drawn to its fullest extent into the extension 14 it will project into the reduced inner end of the extension 15 just far enough to be properly supported by the wall of the said reduced portion of said extension 15. The valve is provided with a stem 22 extending a distance into the extension 15 and such stem is provided with an enlargement, or head, 23 terminating short of the closed end of said extension a sufficient distance to permit of the proper reciprocatory movement of said valve within the casing.

The valve 16 is normally held fully projected into the extension 14 by means of a coil spring 24 encircling the stem 22 and confined between the end of the body of the valve and a flange 25 secured within the enlarged portion of the extension 15.

Figure 2:
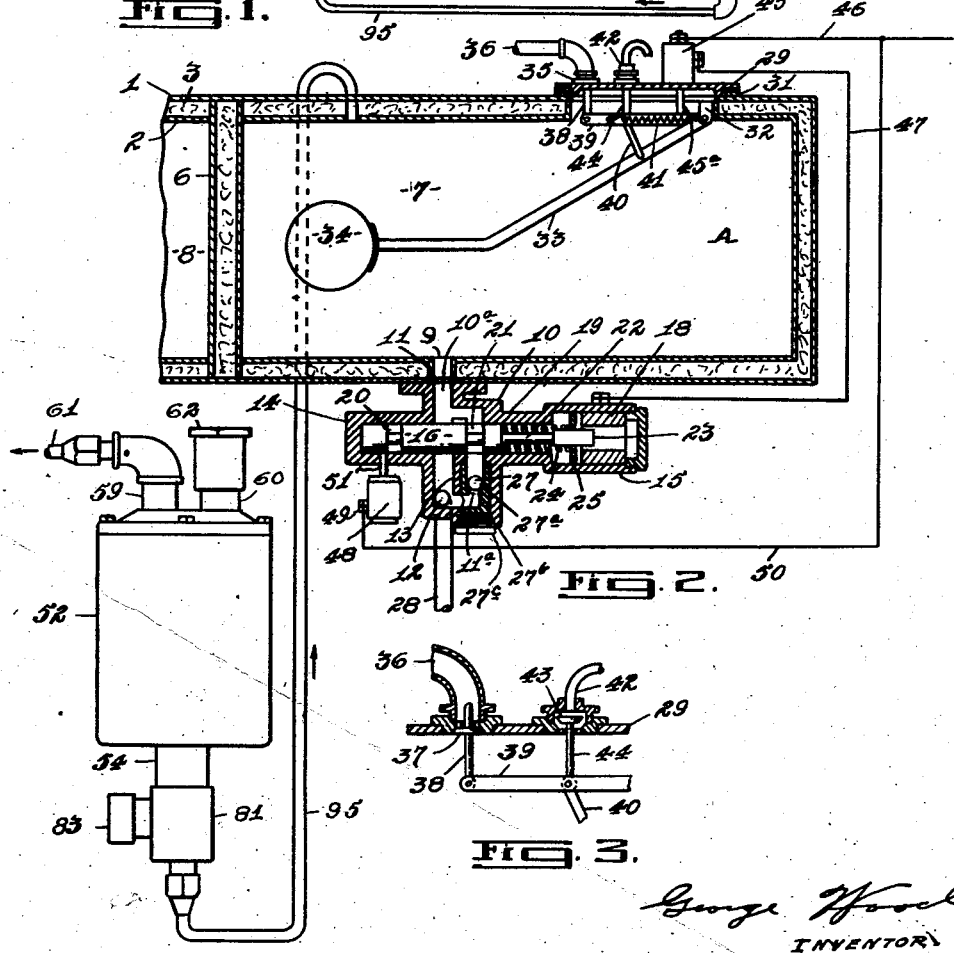
Figure 2 is an enlarged vertical sectional view through the auxiliary tank and the liquid control mechanism, with the air compressing member shown in outline.
Figure 3:
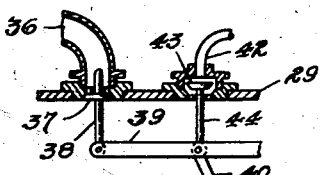
Figure 3 is a central vertical sectional view through the vacuum and air control valves.
Figure 4:
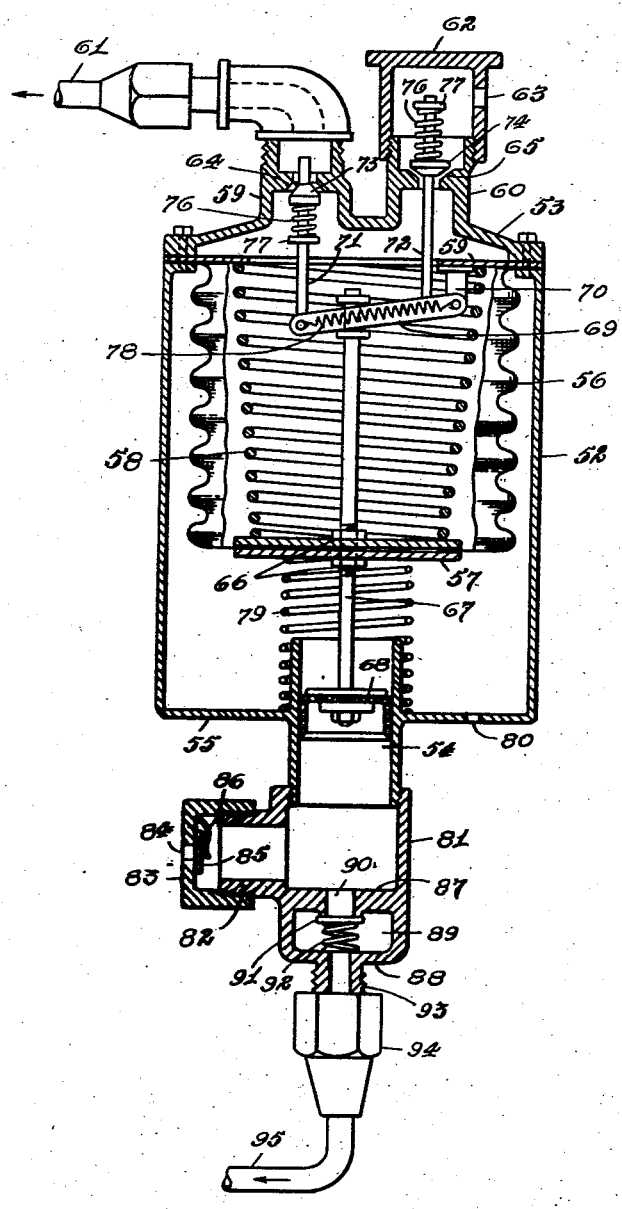
Figure 4 is a vertical sectional view through the air compressor.

It will be obvious that when the valve 16 is in the position shown in Figure 2 the passage to the auxiliary tank will be open and the vertical outlet passage will be closed and when the valve is withdrawn fully against the pressure of the coil spring 24 the vertical outlet passage from the auxiliary tank will be open and the inlet closed and further that when the valve is in its intermediate position both said passages will be closed by the central body of the valve.

A ball 27 seating on an annular shoulder 27a formed on the wall of the passage 11a serves to close the said passage against the escape of water from the auxiliary tank.

The valve housing is provided with a suitable opening 27b in the bottom thereof adapted to be closed by a screw plug 27c.

A pipe 28 leading from the lower end of the radiator and registering with the inlet 12 in the valve casing 10 provides a passage for the liquid in the draining and filling of the radiator and engine.

29 is the float control unit mounted on the top of the auxiliary tank over a suitable opening 30 in said tank and having a suitable gasket seal 31. This float unit carries a bracket 32 to the lower end of which is pivoted one end of a float arm 33 which extends into the water compartment 7 and carries on its free end a float 34.

The member 29 is provided with an outlet 35 communicating by means of a pipe 36 with the interior of the intake manifold of the engine for the purpose of providing a suction for exhausting the air from the interior of the liquid compartment and drawing the water into said compartment.

A valve 37 positioned within the outlet 35 to the suction pipe 36 and seating on a suitable seat within said outlet provides means for opening and closing the entrance to said pipe 36.

The valve 37 is provided with a stem 38 and the lower end of the stem is pivotally connected by means of an arm 39 with the bracket 32. This arm 39 is connected intermediate of its length with the float arm 33, at a point removed from the pivotal point of the latter, by means of a rod 40, whereby movement of the float arm due to the rise of the liquid in the compartment 7 will cause simultaneous movement of the valve 37 into engagement with its seat and thus shut off the vacuum from the intake manifold upon completion of the entry of the liquid into the tank A and whereby downward movement of the float will cause the valve to move from its seat and admit of the operation of the vacuum upon the emptying of the tank.

A spring 41 connected at one end to the arm 39 near its outer end and at its other end to the bracket 32 tends to accentuate the movement of the said arm 39 in its up or down movement.

42 is an air vent extending through the member 29 and having a valve 43 seating on a shoulder or seat therein, said valve having its stem 44 pivoted to the arm 39 whereby on completion of the upward movement of the float arm 33 said valve will have moved away from its seat simultaneously with the closing of the valve 37 in the vacuum pipe and thus admit air to the liquid compartment to permit of the liquid flowing from the tank in the next emptying operation, and whereby downward movement of the float will cause said valve 43 to close simultaneously with the opening of said valve 37 to permit of the suction from the manifold functioning in the next filling operation.

45 is a spring loaded recoil switch of conventional type mounted on the member 29 and having its operating arm 45a connected to the arm 39 whereby movement of said arm in a downward direction will open said switch and movement of the arm in an upward direction will close said switch. A single wire 46 connected to the coil side of the ignition switch (not shown in the drawings) supplies the current to the said switch 45.

The switch 45 is connected to the solenoid 18 by means of a wire 47 whereby on the turning on of the ignition switch, the said solenoid will be energised and thus, when the circuit through the switch 45 is closed by the actuation of the float due to the presence of water in the tank, will cause a pull on the valve 16 and cause same to be drawn to its outermost position and thus bring the cut 20 in said valve into register with the passage 10a and thus permit of the liquid flowing from the tank A through the valve into the pipe 28 and thence to the radiator. As the float lowers in the tank in the emptying operation the arm 45a will cause the opening of the switch 45 and thus de-energise the coil 18, whereupon the valve 16 will be forced, through the action of the spring 24, to the left a sufficient distance to bring the valve into the proper position to close the passages 10a and 11a during the period of operation of the engine as will be described in detail hereinafter.

A casing 48 secured to the under side of the valve casing extension 14 has mounted therein a solenoid of conventional type, designated by the numeral 49, and this solenoid is connected by a wire 50 with the switch 45.

A plunger 51 is adapted to be actuated by the solenoid 49 to an extended position through the lower wall of the extension 14 and into the path of the valve 16 whereby upon the movement of the said valve to the left under the influence of the spring 24 upon the de-energization of the solenoid 18 due to the breaking of the connection in the switch 45 the valve will be held in such a position as to close both of the passages 10a and 11a so that the water from the cooling system cannot be drawn into the auxiliary tank, even though a vacuum is held in said tank, until the ignition has been shut off to de-energise the solenoid 49 and thus permit of the plunger receding into the casing 48 out of the path of the valve 16. When the plunger has moved out of the path of the valve due to the ignition having been turned off the said valve is allowed to proceed to the left to the full limit, in which case the passage 11a is open for the passage of the water from the engine to the auxiliary tank. It is of course obvious that if desired spring means may be employed to more quickly effect the recession of the plunger.

The plunger 51 is so positioned in relation to the valve that it bears against the under face of the said valve when the latter is in its innermost position and is held from its extended position until the valve has progressed to the right sufficiently far to allow it to enter the valve casing and provide means for limiting the return movement of the valve.

Where the auxiliary tank A is located below the level of the top of the radiator, making the return of the liquid to the cooling system by gravity impossible, it is necessary to provide suitable pressure means to force the liquid from the tank to the cooling system. This is accomplished through the medium of air compressing mechanism operable by the suction from the engine manifold and broadly consists in the use of a low vacuum lifting a diaphragm of comparatively large area including a coil spring which, when the vacuum is released, exerts its energy to compress sufficient air to force the water, and the oil if desired, back into the cooling system.

In the compressing means shown herein 52 is a cylindrical casing provided with a head 53 bolted or otherwise secured thereto and at its lower end having a central cylindrical chamber 54 positioned partly within and partly without the end wall 55.

A collapsible bag or casing 56, preferably made of rubber or other suitably flexible material has its open end secured between the top end of the casing 52 and the head 53 and depends downwardly a considerable distance into the said casing 52 and is provided at its lower end with a diaphragm 57.

A coil spring 58 confined between the top member 59 and the diaphragm 57 provides means for influencing the collapsible member 56 towards its extended condition.

The head 53 is provided with parallel outwardly extending open ended valve casings 59 and 60 respectively, the casing 59 having connection with the interior of the engine manifold through the medium of a pipe 61 and the casing 60 having a closure 62 threading thereover, which said closure is provided with an air vent 63.

The valve casings 59 and 60 are provided with seats 64 and 65 respectively, oppositely disposed in relation to one another so that when one valve is open the other will be closed.

Extended through the diaphragm 57 and projecting from each side thereof and adjustably secured thereto by nuts 66 is a main valve stem 67. This stem carries at its lower end a plunger 68 which operates within the chamber 54 and at its top end, located within the collapsible casing 56, has pivotal connection with a transversely extending toggle arm 69 which at its one end is pivoted to a suitable bracket 70 depending from the top member 59.

Extending upwardly from the toggle arm 69 are valve stems 71 and 72 respectively carrying valves 73 and 74 adapted to seat on the valve seats 64 and 65.

The valves 73 and 74 are loosely mounted on the stems and are spring pressed towards their respective seats by coil springs 76 confined between pins 77 and the respective valves.

A coil spring 78 extending lengthwise of the toggle arm 69 and connected at its ends to said arm near the opposite ends of the latter provides means for accentuating the movement of said arm towards a true horizontal position.

79 is a coil spring of relatively lesser strength than the spring 58 and located between the lower wall 55 of the casing 52 and the under surface of the diaphragm 57 for the purpose of compensating for the weight of the diaphragm and the pump plunger.

The lower wall 55 of the casing 52 is provided with an air vent 80.

81 is a cylindrical casing threading on to the lower end of the tubular member 54 and providing a compression chamber in longitudinal alignment with the interior of the said member 54, said casing having a lateral tubular extension 82 capped by a threaded closure 83, which latter has an air inlet 84 therethrough.

A plate 85 extends across the inlet 84 within the closure and is yieldably held over said inlet by a spring finger 86.

The casing 81 has a transverse partition 87 located below the level of the inlet 84 whereby to provide between it and the end wall 88 a chamber 89.

The partition 87 has a centrally disposed outlet 90 leading to the interior of the chamber 89 and in this chamber is located a check valve 91 spring-held over the opening 90 by means of a spring 92.

The lower end of the casing is provided with a downwardly extending nipple 93 to which is secured by means of a suitable fitting 94 a pipe 95 which leads to the interior of the auxiliary tank A through the top wall of the latter.

The operation of the invention hereinbefore described is as follows commencing from the stage wherein the ignition has been shut off and the water from the radiator is in process of being drawn into the auxiliary tank by means of the suction in the tank created by the engine previous to the ignition being shut off, in which case the valve 16 and other elements are in the relative positions shown in Figure 2, with the valve 37 in the suction line open and the valve 43 in the air line closed.

As the water rises in the tank the float 34 is raised to the extent that upon the completion of the entry of water into the tank the valve 37 will be closed and the air valve 43 opened in preparation for the next operation, which will be the returning of the water to the cooling system, and the connection in the switch 45 will be closed in preparation for the turning on of the ignition when it is desired to start the engine. When the water has all been transferred to the tank A the ball 27 will be held to its seat in the passage 11a and thus seal the tank against the escape of water. The operating parts remain in the above recited relative positions during the period that the ignition is off.

When it is desired to again operate the engine the ignition is turned on and the engine started. This has the effect of energising the solenoids 18 and 49 with the result that the valve 16 is instantly drawn to the right to its full extent wherein the passage 11a to the tank A is closed and the cut 20 in the valve is brought into alignment with the passage 10a whereby to permit of the water flowing from the said tank to the engine and radiator.

When the valve 16 in its movement to the right passes beyond the plunger 51 the latter, due to the influence of the solenoid 49, rises into the valve casing and provides a barrier to the valve on its return movement, whereby to hold the said valve to an intermediate position to close both the passages 10a and 11a during the operative period of the engine as will be explained in detail hereinafter.

The reciprocal movement imparted to the valve 73 by the suction in the manifold causes like movement of the air valve 74 and the diaphragm 57 is alternately raised and lowered through the connection between the arm 69 and the valve stem 67. This operates the plunger 68 which compresses the air in the chamber in which said plunger operates and forces said air outwardly through the pipe 95 and into the top of the tank A, whereby the liquid in said tank is forced outwardly and returned to the engine and radiator.

In the emptying of the tank A the float 34 lowers and when it has reached a predetermined point the connection in the switch 45 is broken and the solenoid 18 thereby demagnetised, immediately upon which the spring 24 forces the valve 16 to the left to the point where the end of said valve contacts the plunger 51, wherein the valve is located in such a position as to effectually close both of the passages 10a and 11a and thereby prevent the liquid in the cooling system returning to the tank A during the operation of the engine. The downward movement of the float arm in the emptying of the tank A in the meantime has closed the valve 43 in the air line and has opened the valve 37 in the suction line preparatory to the next operation of transferring the water from the cooling system to the tank.

When it is desired to transfer the water to the tank A for a period of inoperation of the engine it is simply necessary to turn off the ignition, to de-energise the solenoid 49 whereupon the plunger 51 drops out of the path of the valve 16 and allows same under the influence of the spring 24 to force the valve to its extreme leftmost position to bring the cut 21 into alignment with the passage 11a to permit of the water passing to the tank A under the influence of the vacuum created by the engine before being shut off.

While the invention has been described herein principally as relating to the transfer of the water from the cooling system of the machine to the auxiliary storage tank and the return thereof it is of course understood that in the case of aeroplane and other air cooled engines the invention may be employed to transfer the oil from the engine to the storage tank and where both oil and water are used as cooling agents duplicate parts as described hereinbefore can be provided.

As the cooling liquid is completely protected from the elements while it is in the storage tank A it is clear that during any reasonable period of time same will retain practically all of its heat with the result that upon its return to the engine it will instantaneously heat the engine parts and thus insure easy starting.

The invention is particularly adapted for use in air craft, both water and air cooled. In the case of air cooled engines the water compartment of the auxiliary tank is dispensed with.

Air cooled craft that fly in very low temperatures must have their sumps drained upon landing and in order to facilitate subsequent starting the oil may be heated before being returned to the crank case and this device will provide means for accomplishing this conveniently.

In the case of water cooled high speed fighting planes sufficient time has to be allowed after starting the engine to warm the entire system before the throttle may be opened with safety. They are thus earth-bound for a considerable period. By providing a source of instantaneous heat for the engine system by the use of the present invention this dangerous period may be considerably shortened.

While I have illustrated and described the present preferred form of construction for carrying out my invention, this is capable of variation and modification without departing from the spirit of the invention. I, therefore, do not wish to be limited to the precise details of construction set forth, but desire to avail myself of such variations and modifications as come within the scope of the appended claims.

What I claim is:

1. In an engine warming device, in combination with an internal combustion engine and the cooling system thereof including a radiator, an insulated liquid storage tank, a vacuum pipe leading from the manifold of the engine to the interior of said tank at or near the top of the latter, a valve casing having a port in each of two substantially opposed walls and spaced liquid passages communicating with said ports, one of said ports being in communication with the lower interior of said tank, a conduit leading from the other of said ports to the radiator, a check valve located in one of said liquid passages, a valve movable across said liquid passages, said valve having two spaced circumferential grooves spaced at variance with the spacing of said liquid passages whereby in one position of said valve one of said circumferential grooves will be aligned with one of said liquid passages only to permit of the flow of liquid to said tank, in another position the other of said grooves will be aligned with the other of said liquid passages to permit of the flow of liquid from said tank and in another position both of said liquid passages will be closed, a float controlled by level of the liquid in said tank, an air relief passage associated with said tank, means controlled by said float for closing said vacuum pipe and opening said air relief passage simultaneously when the liquid has been transferred to said tank and opening said vacuum pipe and closing said air relief passage when the liquid has been transferred to said cooling system, and float controlled electrical means adapted, in the raised condition of said float due to the presence of liquid in said tank to move said valve to close the liquid passage in said valve casing to said tank and to open the liquid passage from said tank and in the lowered position of said float holding said valve to a position wherein both of said liquid passages are closed.

2. In an engine warming device, in combination with an internal combustion engine and the cooling system thereof including a radiator, an insulated storage tank, a vacuum pipe connecting the top of said tank with the manifold of the engine, a conduit connecting said tank with said radiator for the transfer of liquid from one to the other, a valve casing interposed in said conduit, said valve casing having parallel liquid passages communicating at their ends with said conduit, one of said passages being for use in the flow of liquid to said tank and having a check valve therein to prevent the escape of liquid from the tank and the other of said passages being for use in the flow of liquid from said tank, a valve movable across said liquid passages within said casing, said valve having two circumferential grooves spaced at variance with the spacing of said liquid passages, said valve being spring influenced to a position in which the liquid passage to said tank will be open, a float controlled by differences in the level of the liquid in said tank, means operable by the float on the emptying of the tank to open said vacuum pipe, and on the filling of the tank to close said vacuum pipe, an electric circuit including a circuit closer actuated by said float to a closed condition at the completion of the flow of liquid to said tank whereby on the turning on of the ignition to move said valve against the spring influence thereon to close the passage to said tank and open the passage from said tank and on the completion of the emptying of said tank actuated to an open condition whereby to release said valve, said electric circuit also including means for arresting the return of said valve under the spring influence at a point to close both of said liquid passages during the period the ignition is on.

3. In an engine warming device, the combination of an engine and its cooling system including a radiator, an insulated storage tank, a conduit connecting said tank with said radiator for the transfer of liquid from one to the other, a valve casing interposed in said conduit, said valve casing having parallel liquid passages therethrough one of which is used in the flow of liquid to said tank and having a check valve seating therein to prevent the escape of liquid from the tank and the other of which passages is for the flow of liquid from said tank, a valve movable across said liquid passages, said valve having two circumferential grooves spaced at variance with the spacing of said liquid passages, spring means influencing said valve to a position in which one of said circumferential grooves will be in register with the liquid passage to said tank, an electric circuit including a solenoid adapted to actuate said valve against the influence of said spring means to bring the other of said grooves into register with the liquid passage used in the flow of liquid from said tank, a circuit closer, a float actuated by the level of the liquid in said tank and operating said circuit closer to energise said solenoid, electric means unaffected by the action of said circuit closer adapted upon the opening of the electric circuit and the consequent release of said valve to arrest the movement of said valve at a point to close both of said liquid passages, a vacuum pipe connecting said tank with the manifold of the engine whereby the liquid is drawn by suction into said tank, a pressure pipe leading from the engine manifold to the top interior of said tank, and means interposed in said pressure pipe subject to the impulses in said manifold to compress air and force same into said tank to force the liquid from said tank into the radiator upon the movement of said valve to a position to open the liquid passage from said tank.

4. In an engine warming device, the combination of an engine and its cooling system including a radiator, a liquid storage tank, a conduit connecting said storage tank with said radiator, a vacuum pipe connecting said tank at the top thereof with the engine manifold whereby the liquid is drawn by suction from the cooling system through said conduit, a valve interposed in said conduit, said valve having three positions, in one of which the liquid is permitted to flow to said tank, in another of which the liquid is permitted to flow out of said tank and in another of which the said conduit is closed against the flow of liquid to or from said tank, said valve being spring influenced to the first mentioned position, a float adjustable through the variations of the level of the liquid in said tank, an electric circuit including a solenoid for said valve, means actuated by said float in its movement in the absence of current in the electric circuit to close said circuit whereby on the electrifying of the circuit said valve will be drawn against spring influence to a position to permit liquid flowing from said tank, means actuated by said float for opening said circuit through said solenoid upon the emptying of said tank and for closing said circuit upon the filling of said tank, an air inlet to said tank, means operated by said float adapted on the completion of the filling of said tank to close said vacuum and open said air inlet and on the emptying of said tank to open said vacuum and close said air inlet, and air compressing means operable by the suction from the engine manifold to force the liquid from said tank.

5. An engine warming device according to claim 4, in which said air compressing means comprises a main casing having a valve controlled outlet to said vacuum pipe and a valve controlled air inlet, the valves in said vacuum pipe and in said air inlet being oppositely directed, said casing at its lower end having a valve chamber leading downwardly and communicating at its lower end with a compression chamber having a valve controlled air inlet and also having a valve controlled outlet to said tank, a collapsible air bag located within said main casing and open at its top end to said outlet to said vacuum pipe and to said air inlet, a pivoted arm having connection at points therealong with the respective stems of said valves in said vacuum pipe and said air inlet, a main valve rod having pivotal connection at its top end with said arm to which the stems of said valves in said vacuum pipe and said air inlet are connected and extending downwardly through the lower closed end of said air bag and carrying a plunger operating in said valve chamber in the lower end of said main casing, a coiled spring within said air bag influencing said air bag to its extended condition, and a coiled spring of relatively lesser strength than the spring in said air bag located between the lower end of said air bag and the lower end of said main casing adapted to exert upward pressure on said air bag.

GEORGE WOOD.